United States Patent Office 3,027,010
Patented Mar. 27, 1962

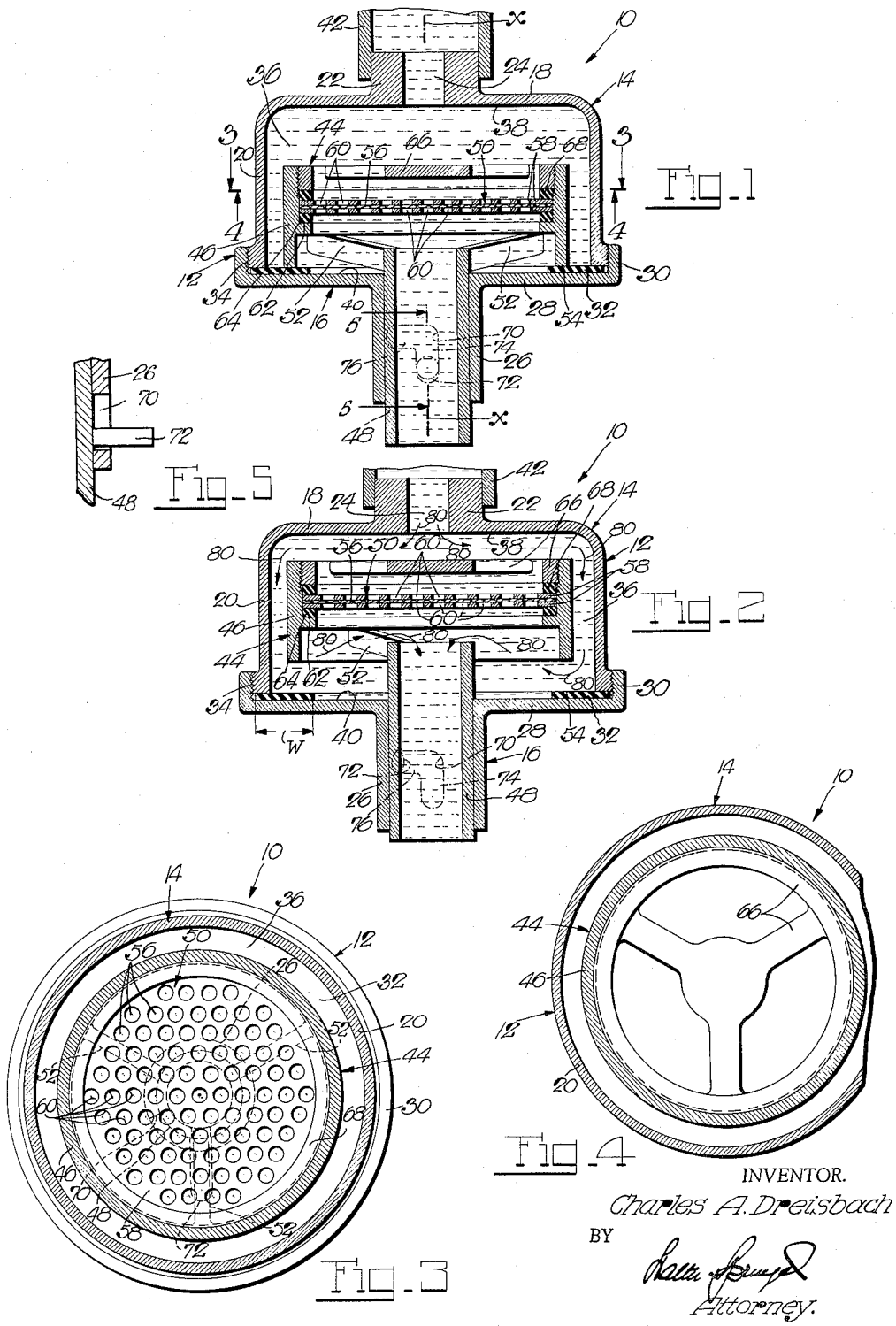

3,027,010
FLUID FILTER ADAPTER
Charles A. Dreisbach, 83–85 Warburton Ave.,
Yonkers, N.Y.
Filed Sept. 18, 1959, Ser. No. 840,859
1 Claim. (Cl. 210—239)

This invention relates to fluid filters in general, and to filter adapters for fluid lines in particular.

It is an object of the present invention to provide a filter adapter for fluid taps, and especially for household water taps, to remove from the water such unhygienic or at least distasteful suspended matter which will usually remain despite the customary purification of tap water at its source, thereby to obtain from taps anywhere assuredly pure water for personal consumption.

It is another object of the present invention to provide a filter adapter of this type which on simple manipulation may pass all water through the filter proper or bypass it therearound for discharge in filtered or unfiltered condition, respectively, thereby to permit restricted use of the filter proper for personal water consumption only and accordingly prolong its use as such before requiring its replacement with a clean filter.

It is a further object of the present invention to provide a filter adapter of this type which may readily be attached to a tap or other discharge conduit and may remain thus attached while permitting ready replacement of the filter proper.

Another object of the present invention is to provide a filter adapter of this type which comprises a casing having a valve seat between an inlet chamber and a discharge passage thereof, and further comprises in the inlet chamber a combined valve and filter unit which by simple manipulation of an external handle on the adapter is raised from and lowered against the valve seat to permit the water to flow through the open valve seat and out through the discharge passage in unfiltered condition, and to compel the water to flow through the filter of the seated unit and out through the discharge passage in filtered condition, respectively.

Other objects and advantages will appear to those skilled in the art from the following, considered in conjunction with the accompanying drawings.

In the accompanying drawings, in which certain modes of carrying out the present invention are shown for illustrative purposes:

FIG. 1 is a section through a filter adapter embodying the present invention;

FIG. 2 is a section through the same filter adapter, showing a certain operating unit thereof in a different position, however;

FIGS. 3 and 4 are sections through the filter adapter taken on the lines 3—3 and 4—4, respectively, of FIG. 1; and FIG. 5 is a fragmentary section taken on the line 5—5 of FIG. 1.

Referring to the drawings, and more particularly to FIGS. 1 and 2 thereof, the reference numeral 10 designates a filter unit or adapter especially, though by no means exclusively, for a water tap. The filter unit 10 comprises a casing 12 which is presently made of two complemental sections 14 and 16. The casing section 14 is of general cup shape, having a bottom 18 and an endless, presently annular, rim 20 which is open at its top, as well as a central boss 22 on the bottom 18 which is provided with an inlet 24. The other casing section 16 comprises an outlet tube 26 having an outwardly formed endflange 28 terminating in a short axial skirt formation 30. Resting on the endflange 28 is a ring-shaped sealing gasket 32 which may be of rubber or any other suitable material, and which is of considerable width w and extends to the skirt 30 for reasons which will become obvious hereinafter. The two casing sections 14 and 16 are releasably attached to each other by threading the rim 20 of the section 14 into the skirt 30 of the section 16 as at 34 with the top of the rim 20 being in firm sealing engagement with the adjacent peripheral portion of the gasket 32. The casing sections 14 and 16 thus attached to each other define a chamber 36 with a longitudinal axis x—x into and from the opposite ends 38 and 40 of which lead the inlet 24 and the outlet tube 26, respectively, with these chamber ends 38 and 40 being presently formed by the bottom 18 and flange 28 of the casing sections 14 and 16, respectively. The casing 12, and hence the entire filter unit 10, may at the boss 22 be releasably attached, for example to a water tap (not shown), through any suitable adapter, such as a clamp-on fitting 42, for example.

Provided in the casing 12 is a combination valve and filter unit 44 the major parts of which are a sleeve 46, a tubular shank 48 on the sleeve 46 and a filter device 50 in the sleeve. The sleeve 46, which is located in the chamber 36 coaxially thereof, is integrally joined by spider arms 52 with the tubular shank 48 which is axially slidable as well as rotatable in the outlet tube 26 of the casing 12 for movement of the sleeve 46 onto and from a valve seat 54 which presently is an adjacent part of the gasket 32 (FIG. 1). The filter device 50 provides, in the present example, a filter disc 56 of flexible cloth or any other suitable filter material, as well as a rigid backing disc 58, and presently two of them between which the filter disc 56 is interposed and which are provided with a multiplicity of apertures 60 for admitting fluid, such as water, to and through the filter disc, with the backing discs serving to protect the filter disc against tearing on forced fluid flow therethrough. The backing discs 58 with the interposed filter disc 56 rest on an annular shoulder 62 in the sleeve 46, preferably through intermediation of a gasket 64, and they are releasably retained thereon by a filter set 66, again preferably through intermediation of another gasket 68. The filter set 66 is presently a spider nut threadedly received in the sleeve 46.

For shifting the unit 44 into the filtering and non-filtering positions in FIGS. 1 and 2, respectively, and for holding this unit in its non-filtering position, there is presently provided a bayonet slot and pin connection 70, 72 between the outlet tube 26 of the casing 12 and the tubular shank 48 therein of the unit 44. More particularly, the bayonet slot 70 is provided in the outlet tube 26 and the pin 72 projects from the tubular shank 48 and extends through and beyond the bayonet slot 70, with the latter having branches or lengths 74 and 76 extending longitudinally and transversely, respectively, of the outlet tube 26 (FIG. 1). Thus, the pin 72, which serves as a handle, will be lowered in the longitudinal slot branch 74 in order to bring the unit 44 into its filtering position (FIG. 1), and the pin 72 will be raised in the longitudinal slot branch 74 and shifted into the transverse slot branch 76 in order to raise the unit 44 into its non-filtering position and hold it in this position (FIG. 2).

If it is desired to obtain filtered water from a tap, for example, to which the filter adapter 10 is attached, the unit 44 is shifted into the filtering position shown in FIG. 1, and the taps is then opened. Water flowing through the inlet 24 into the chamber 36 is then compelled to pass through the filter device 50 for its discharge from the filter adapter, presently through the tubular shank 48 of the unit 44. If it is desired to obtain unfiltered water from the tap, the unit 44 is shifted into its non-filtering position (FIG. 2) in which water in the chamber 36 bypasses the filter device 50 and flows to the tubular shank 48 as indicated by the arrows 80 in FIG. 2. In this connection, the extension of the tubular shank 48 with its inner end into the confines of the sleeve 46 toward the filter discs 56, 58 is quite significant since the space between this inner shank end and the filter discs forms an abrupt constriction in the flow path of unfiltered water from the sleeve end facing the valve seat 54 to the shank 48, the cross-sectional area of the sleeve 46 being accordingly large (FIG. 2). Thus, in this flow path the unfiltered water will not only flow upwardly against the filter but it will on its approach to and passage through the described constriction reach maximum pressure and back into the filter disc 56, thereby dislodging from the interior of the same considerable impurities opposite to the direction in which they entered and, in consequence, keeping this filter disc fairly clean for the longest time.

The present filter adapter 10 is advantageous from several standpoints. Thus, it is a structurally simple and, hence, inexpensive adapter for any tap to obtain filtered water for human consumption. The shiftability of its combined valve and filter unit 44 into filtering and non-filtering positions offers the choice of using the filter device 50 judiciously for human water consumption only with ensuing usability of a filter disc for an optimum length of time before requiring replacement. Also, the adapter 10 is constructed for ready replacement of a filter disc without requiring its disconnection from a tap. Thus, to replace a filter disc, it is merely necessary to unscrew the lower casing section 16 from the tap-attached upper casing section 14 and remove it and the combined valve and filter unit 44 from this upper casing section, whereupon the spider nut 66 is unscrewed from the sleeve 46 and the top gasket 68 and stacked backing and filter discs 58 and 56 dropped from the sleeve. A new filter disc 56 is then placed between the backing discs 58, and these are reseated on the lower gasket 64 with the upper gasket 68 returned on top of these seated discs and the spider nut rethreaded into the sleeve, whereupon the lower casing section 16 is rethreaded to the upper casing section.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claim are intended to be embraced therein.

What is claimed is:

A filter adapter, comprising a casing with a longitudinal axis having a chamber with an inlet and an axial outlet tube leading from and surrounded by a valve seat at one end of said chamber; a combination valve and filter unit having a sleeve in said chamber coaxial with said outlet tube and providing a through-passage, a tubular shank slidably received in said outlet tube and providing the sole discharge passage from said chamber, spider arm means joining said shank with said sleeve internally thereof near its one end facing said valve seat, and a filter disc extending across the through-passage in said sleeve and being spaced axially from said shank, with said unit being guided by its slidable shank in said outlet tube for movement into filtering and non-filtering positions in which its sleeve is seated on and removed from said valve seat for fluid flow through said casing via said filter disc and bypassing the latter, respectively, with said tubular shank extending with its inner end into the confines of said sleeve and the cross-sectional area of said sleeve around said shank being so large that in the non-filtering position of said unit the space between said inner shank end and filter disc forms an abrupt constriction in the flow path from said one sleeve end to said shank; and a device including a handle on the slidable shank operable externally of said casing for moving said unit into said filtering and non-filtering positions.

References Cited in the file of this patent

UNITED STATES PATENTS

| | | |
|---|---|---|
| 304,316 | Hallowell | Sept. 2, 1884 |
| 574,644 | Vance | Jan. 5, 1897 |
| 621,768 | Hill | Mar. 21, 1899 |
| 1,179,387 | Auschutz | Apr. 18, 1916 |
| 2,895,613 | Griffiths | July 21, 1959 |